(12) United States Patent
Friedl

(10) Patent No.: US 10,458,276 B2
(45) Date of Patent: Oct. 29, 2019

(54) JET ENGINE WITH MULTIPLE CHAMBERS AND A BEARING CHAMBER SUPPORT

(71) Applicant: Rolls Royce Deutschland Ltd & Co KG, Blankenfelde-Mahlow (DE)

(72) Inventor: Winfried-Hagen Friedl, Berlin (DE)

(73) Assignee: Rolls-Royce Deutschland Ltd & Co KG, Blankenfelde-Mahlow (DE)

(*) Notice: Subject to any disclaimer, the term of this patent is extended or adjusted under 35 U.S.C. 154(b) by 467 days.

(21) Appl. No.: 15/297,592

(22) Filed: Oct. 19, 2016

(65) Prior Publication Data
US 2017/0107854 A1    Apr. 20, 2017

(30) Foreign Application Priority Data
Oct. 19, 2015 (DE) .................. 10 2015 117 773

(51) Int. Cl.
*F01D 25/16*      (2006.01)
*F02K 1/80*      (2006.01)
(Continued)

(52) U.S. Cl.
CPC ............ *F01D 25/162* (2013.01); *F01D 11/04* (2013.01); *F01D 25/125* (2013.01);
(Continued)

(58) Field of Classification Search
CPC ...... F01D 25/162; F01D 11/04; F01D 25/183; F01D 25/125; F02K 1/805; F02C 7/25;
(Continued)

(56) References Cited

U.S. PATENT DOCUMENTS

| | | | |
|---|---|---|---|
| 4,156,342 A | 5/1979 | Korta et al. | |
| 2005/0235651 A1 | 10/2005 | Morris et al. | |

FOREIGN PATENT DOCUMENTS

| | | |
|---|---|---|
| DE | 2408839 C2 | 4/1984 |
| DE | 19719777 A1 | 12/1997 |

(Continued)

OTHER PUBLICATIONS

German Search Report dated Jun. 22, 2016 from counterpart German Patent App No. 102015117773.0.
(Continued)

*Primary Examiner* — Eldon T Brockman
(74) *Attorney, Agent, or Firm* — Shuttleworth & Ingersoll, PLC; Timothy Klima

(57) ABSTRACT

A jet engine with a bearing chamber, a sealing chamber, a de-aeration chamber and a bearing chamber support, the support delimiting the bearing chamber comprising at least one bearing appliance in certain areas. The bearing chamber is separated from the sealing chamber via a sealing appliance, with the sealing chamber being separated via a further sealing appliance from the de-aeration chamber that is arranged at the side of the sealing chamber facing away from the bearing chamber. The sealing chamber is connected to a sealing air conduit, by which the bearing chamber can be supplied with a sealing air volume flow. The de-aeration chamber is connected to a de-airing appliance via which a volume flow can be discharged from the de-aeration chamber into a core flow channel of the jet engine. The de-airing appliance is embodied as at least one air extraction duct with a tubular flow cross-section.

16 Claims, 6 Drawing Sheets

(51) Int. Cl.
  *F01D 11/04* (2006.01)
  *F01D 25/12* (2006.01)
  *F01D 25/18* (2006.01)
  *F02C 7/25* (2006.01)
(52) U.S. Cl.
  CPC ............... *F01D 25/183* (2013.01); *F02C 7/25* (2013.01); *F02K 1/805* (2013.01); *F05D 2220/323* (2013.01); *F05D 2230/21* (2013.01); *F05D 2250/185* (2013.01); *F05D 2260/608* (2013.01); *F05D 2260/6022* (2013.01); *Y02T 50/675* (2013.01)
(58) Field of Classification Search
  CPC ......... F05D 2250/185; F05D 2260/608; F05D 2220/323; F05D 2230/21; F05D 2260/6022; Y02T 50/675
  See application file for complete search history.

(56) References Cited

FOREIGN PATENT DOCUMENTS

| | | |
|---|---|---|
| DE | 102009012038 A1 | 9/2010 |
| DE | 102009055880 A1 | 6/2011 |
| DE | 112012005939 T5 | 12/2014 |
| EP | 0752515 A2 | 1/1997 |
| GB | 595346 A | 12/1947 |

OTHER PUBLICATIONS

European Search Report dated Mar. 7, 2017 from counterpart European App No. 16193949.1.

JET ENGINE WITH MULTIPLE CHAMBERS AND A BEARING CHAMBER SUPPORT

This application claims priority to German Patent Application DE102015117773.0 filed Oct. 19, 2015, the entirety of which is incorporated by reference herein.

The invention relates to a jet engine with a bearing chamber, a sealing chamber, a de-aeration chamber and a bearing chamber support according to the present disclosure.

What is known from practice are jet engines with a bearing chamber in the area of a turbine device, in the area of which a low-pressure shaft is mounted opposite a high-pressure shaft by means of two bearing appliances. During operation of the jet engine, an air-oil mixture forms inside the bearing chamber due to the intermixing of air and the oil that is provided for lubricating the bearing appliances. In order to prevent the air-oil mixture from exiting the bearing chamber, the bearing chamber is impinged with so-called sealing air during operation of the jet engine. For this purpose, respectively one sealing chamber is provided upstream and downstream of the bearing chamber, with the sealing chamber being separated from the bearing chamber by a labyrinth seal, wherein the sealing air is supplied to the sealing chambers via a sealing air conduit and is conducted further into the bearing chamber via the respective labyrinth seal.

In addition, a de-aeration chamber is arranged respectively on those sides of the sealing chambers that are facing away from the bearing chambers, with the de-aeration chamber in turn being respectively separated from the respective sealing chamber via a labyrinth seal and also being impinged with sealing air from the sealing chambers. Via a de-airing appliance, the de-aeration chambers are in operative connection with a core flow channel or a main gas channel, so that during operation of the jet engine an air mixture is discharged from the de-aeration chambers into the core flow channel. In the case that an air-oil mixture enters the sealing chambers from the bearing chamber, this mixture is discharged into the core flow channel via the de-aeration chambers and the de-airing appliances. Thus, it is avoided through the de-airing appliances that the air-oil mixture enters a rotor space comprising rotors, and that a fire or so-called oil fire occurs as a result of the ignition of the air-oil mixture due to the increased temperatures that are present in this area during the operation of the jet engine, by which an undesired damage may be caused in this area.

In the embodiments known from practice, the de-airing appliance is formed by a bearing chamber support or a bearing carrier, which supports the bearing appliances, together with sheet metal attachments, which are arranged upstream and downstream of the bearing chamber support. In this manner, flow areas are created that extend from the respective de-aeration chamber to the core flow channel and that are embodied as annular spaces, and that are referred to as so-called hot vent passages. Through the de-airing appliance, air or an air-oil mixture can be discharged from the de-aeration chambers into the core flow channel, wherein an ignition of the air-oil mixture that is introduced into the core flow channel can be easily handled in this area.

However, in de-airing appliances that are embodied in such a manner, a distance between the bearing chamber support and the sheet metal attachments cannot be set so as to be arbitrarily small due to tolerances and mechanical boundary conditions, so that a cross-sectional surface of the de-airing appliances increases towards the outside in the radial direction of the jet engine and that a flow velocity inside the de-airing appliances can be influenced in a negative manner. Further, the sheet metal attachments have to be embodied in a solid manner in order to achieve a desired resistance with respect to an oil fire which may possibly occur in the air extraction ducts, so that the jet engine disadvantageously has a greater weight.

Known from EP 0 752 515 A2 is a bearing chamber arrangement according to the kind as it is more closely described above, in which the sealing chamber is supplied with sealing air via a supply line. From the de-aeration chamber, the sealing air is discharged via an air extraction duct into a flow channel.

The present invention is based on the objective to provide a weight-optimized jet engine, in which the de-airing appliance is embodied in a constructionally simple manner and a desired flow velocity of a volume flow that is conducted inside the de-airing appliance can be achieved across the entire extension of the de-airing appliance.

This objective is achieved through a jet engine with features as disclosed herein.

What is proposed is a jet engine with a bearing chamber, a sealing chamber, a de-aeration chamber and a bearing chamber support, which in certain areas delimitates the bearing chamber that comprises at least one bearing appliance. The bearing chamber is separated from the sealing chamber via a sealing appliance, with the sealing chamber in turn being separated via a further sealing appliance from the de-aeration chamber that is arranged at the side of the sealing chamber that is facing away from the bearing chamber. The sealing chamber is connected to a sealing air conduit by means of which the bearing chamber can be supplied with a sealing air volume flow. The de-aeration chamber is connected to a de-airing appliance via which a volume flow can be discharged from the de-aeration chamber into a core flow channel of the jet engine. According to the invention, the de-airing appliance is embodied as at least one air extraction duct with a tubular flow cross-section.

Through the embodiment of the air extraction duct according to the invention, a desired flow velocity of a volume flow or fluid, which is also referred to as a so-called hot vent, and which is conducted through the air extraction duct during operation of the jet engine, can be achieved in a constructionally simple manner. This results from the fact that the air extraction duct, which is for example embodied with an oval, in particular a circular, a rectangular, in particular square-shaped, or a comparable cross-section, which in particular extends from the de-aeration chamber to the core flow channel, can be embodied with low tolerances. In addition, the air extraction duct according to the invention can advantageously be manufactured with a low weight and low costs. Because the air extraction duct can be embodied with a reduced flow cross-section as compared to the embodiment of the de-airing appliance with sheet metal attachment as it is known from practice, while predefined tolerances are also being observed, a sealing air volume flow that is reduced as compared to the known embodiment is sufficient in the solution according to the invention to reliably seal the bearing chamber and discharge a volume flow from the de-aeration chamber. In this manner, the jet engine's level of efficiency is advantageously improved.

Through the embodiment of the air extraction duct with a tubular flow cross-section it can be ensured in a simple manner that a flow velocity is substantially constant and in particular lies above a so-called flame velocity of an air-oil mixture that is conducted inside the air extraction duct in the entire air extraction duct. In this manner, a stable oil fire in the air extraction duct can be avoided in a reliable manner in all operating states of the jet engine.

In a particularly advantageous embodiment of the jet engine according to the invention, it is provided that the bearing chamber support is embodied as a cast component and that the air extraction duct is part of the bearing chamber support. The jet engine can be embodied in a particularly low-weight manner by molding the air extraction duct into the bearing chamber support, wherein in addition a flow cross-section of the air extraction duct and a course of the air extraction duct inside the bearing chamber support can be set in an advantageously exact manner. Also the mounting of the jet engine is rendered easier as compared to known embodiments by integrating the air extraction duct in the bearing chamber support.

In addition, it can be provided that the air extraction duct has a connecting piece for connecting to the de-aeration chamber and/or the core flow channel, wherein the latter parts can be manufactured as integral structural components that extend beyond the bearing chamber support and that are manufactured together with the bearing chamber support in the course of a single molding procedure.

Alternatively, one or both these parts can also be embodied as separate structural components which can be brought in operative connection with the bearing chamber support. By integrating the air extraction duct inside the bearing chamber support, a jet engine according to the invention can advantageously be used at higher temperatures in the area of the air extraction duct as compared to known embodiments, since the retention times of the possibly oily mixture inside the air extraction duct can be reduced as compared to known embodiments if the flow cross-section is designed accordingly, and in this manner shorter ignition delay times can be handled at higher temperatures.

In an advantageous embodiment of the invention, the air extraction duct is embodied as a separate conduit, that at least in certain areas is arranged in a circumferential area of the bearing chamber support. At that, the air extraction duct can be manufactured independently of the bearing chamber support and can for example be embodied with a metal alloy that is suitable for the high-temperature range, or with ceramics.

If the air extraction duct has a substantially constant cross-section across its extension, it can be ensured in a simple manner that the fluid that is conducted through the air extraction duct has a substantially constant flow velocity in the entire air extraction duct, preferably lying above a so-called flame velocity, which makes a stabilizing oil fire possible, in all operating states.

In an advantageous embodiment of the jet engine according to the invention, the air extraction duct has an area with a defined cross-section expansion. At that, this area is a recirculation zone in which an oil fire may occur due to the reduction of flow velocity. In this manner it can be ensured that if there is an oil fire in the area of the air extraction duct, it occurs in a defined area. At that, the area can be designed in a simple manner in such a way that it withstands an oil fire in a reliable manner to a desired extent. To detect an oil fire in the air extraction duct it is thus sufficient if sensors for detecting an oil fire are only arranged in the defined area. As an alternative, it can be determined only in this area, for example by means of a borescopics examination, whether an oil fire has occurred in the air extraction duct. The danger of an undetected damage through an oil fire is thus reduced in a simple manner.

In an advantageous embodiment of the invention, the cross-section of the air extraction duct increases in the area by a factor of at least two, preferably of approximately ten. Through this leaping cross-sectional expansion of the air extraction duct it can be ensured in a simple manner that an oil fire in the air extraction duct occurs in the defined area. In addition, the area can be positioned at a desired position in the air extraction duct in a simple manner.

The defined area or a recirculation zone can be created in a simple manner, if a wall of the air extraction duct in the area has an angle with respect to a central axis of the air extraction duct that is larger than 15°, in particular larger than 60°, preferably larger than 75°, and in particular approximately 90°, wherein the air extraction duct has a larger flow cross-section downstream of the area than upstream of the area.

If a flow cross-section of the air extraction duct does substantially not increase downstream of the area as compared to a flow cross-section in the area and in particular is at least approximately constant, it can be ensured that a stabilized oil fire inside the air extraction duct can only occur in the defined area.

The sealing chamber and the de-aeration chamber can respectively be arranged downstream or upstream of the bearing chamber, wherein preferably respectively one sealing chamber and one de-aeration chamber are provided downstream as well as upstream of the bearing chamber.

In an advantageous embodiment of a jet engine according to the invention, it is provided that at least one air extraction duct is connected to the de-aeration chamber upstream of the bearing chamber, and at least one further air extraction duct is connected to the de-aeration chamber downstream of the bearing chamber, wherein they can for example be arranged in different circumferential areas of the jet engine and thus can be integrated in a simple manner in a bearing chamber support and/or can be arranged in a simple manner as separate conduits in a circumferential area of the bearing chamber support.

It can be provided that multiple air extraction ducts are provided via which fluid can be supplied from a de-aeration chamber to the core flow channel. These are preferably arranged in different circumferential areas of the bearing chamber support.

In an embodiment of the jet engine that is optimized with respect to the installation place, it is provided that the air extraction duct and the further air extraction duct are connected to each other upstream of the core flow channel and in particular are together led to the core flow channel downstream of a sealing air conduit. As an alternative, it can also be provided that the air extraction duct and the further air extraction duct are led into the core flow channel separately, wherein the conduits are in particular led to the core flow channel downstream of a sealing air conduit.

The bearing chamber support of the jet engine according to the invention can be arranged in the area of a turbine device and/or in the area of a compressor appliance or compactor appliance of the jet engine.

The features that are specified in the patent claims as well as the features that are specified in the following exemplary embodiments of the jet engine according to the invention are suitable to further develop the subject matter according to the invention respectively on their own or in any combination with each other.

Other advantages and advantageous embodiments of the jet engine according to the invention follow from the patent claims and the exemplary embodiments that are described in principle in the following by referring to the drawing, wherein, with a view to clarity, the same reference signs are respectively used for structurally and functionally identical structural components.

Herein:

FIG. 1 shows a strongly schematized longitudinal sectional view of a section of a jet engine in the area of a turbine device, wherein a bearing chamber and multiple further chambers that are connect thereto can be seen, and wherein an air extraction duct which is connected to a de-aeration chamber that is arranged upstream of the bearing chamber and which is integrated inside the bearing chamber support;

Figure 5:
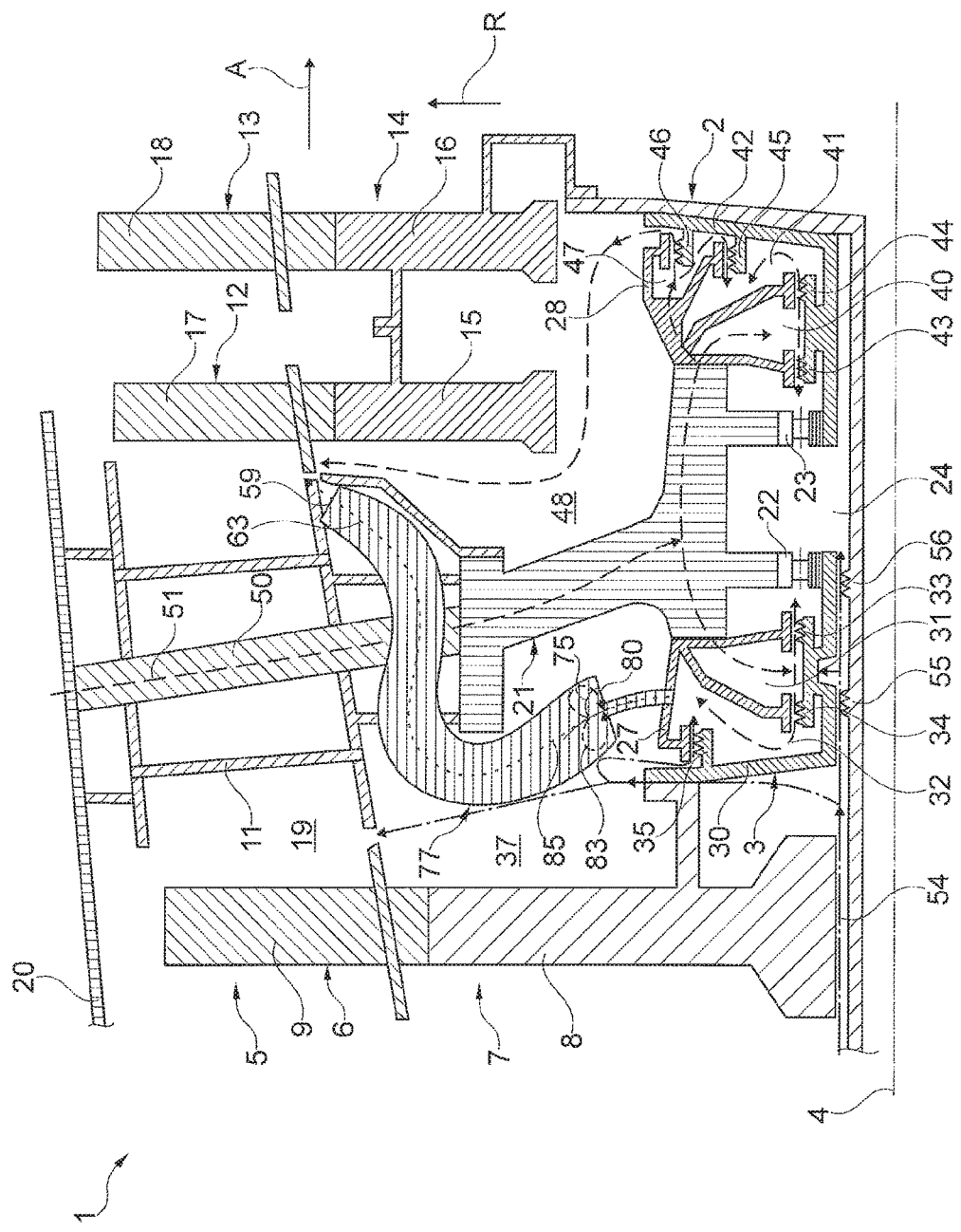
Figure 6:
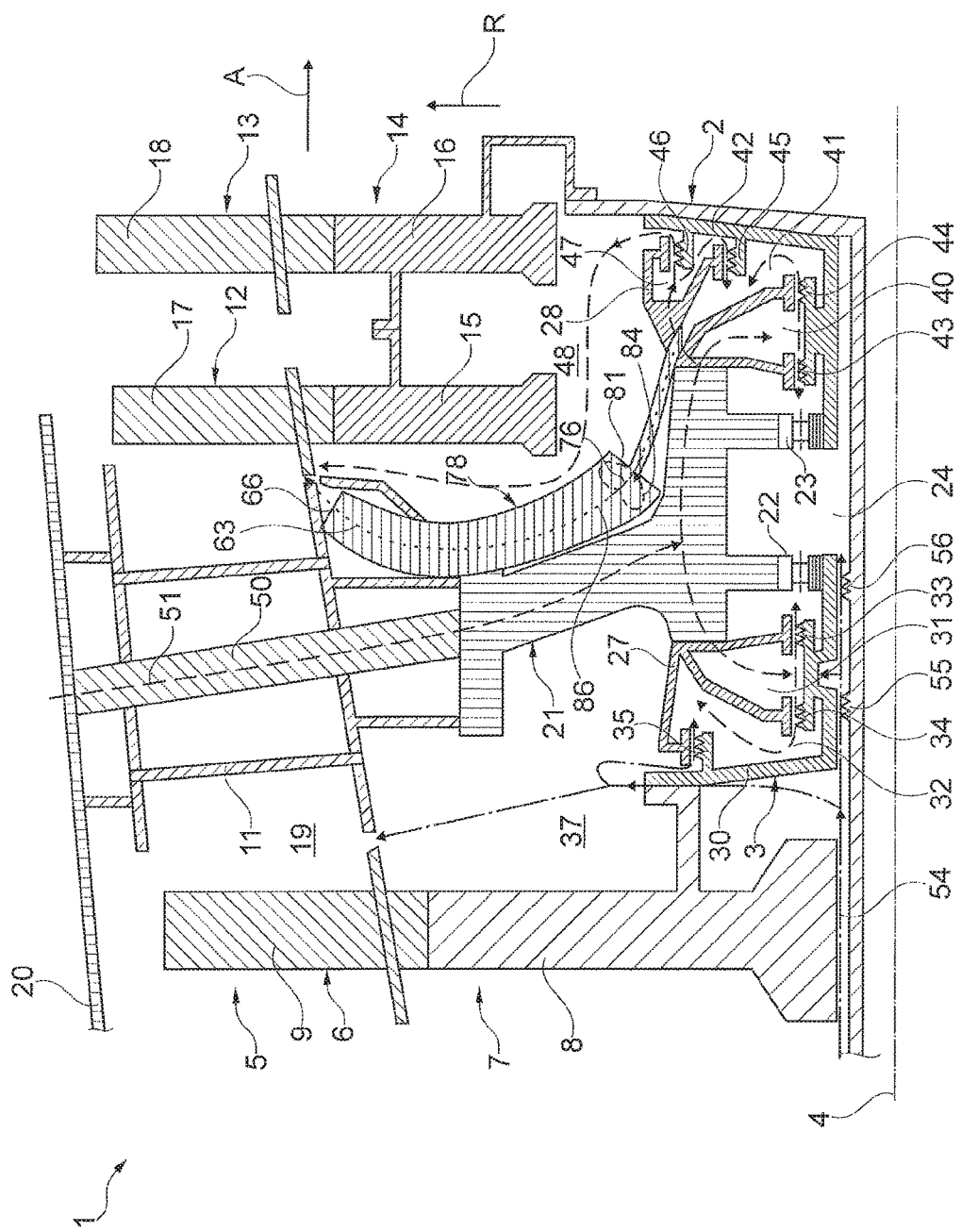

FIG. 5 shows a further alternative embodiment of an air extraction duct with a recirculation area, which is connected to a de-aeration chamber that is arranged upstream of the bearing chamber, wherein the air extraction duct is embodied as a separate conduit; and FIG. 6 shows a further alternative embodiment of a further air extraction duct with a recirculation area, which is connected to the de-aeration chamber that is arranged downstream of the bearing chamber, wherein the further air extraction duct is embodied as a separate conduit.

Figure 1:
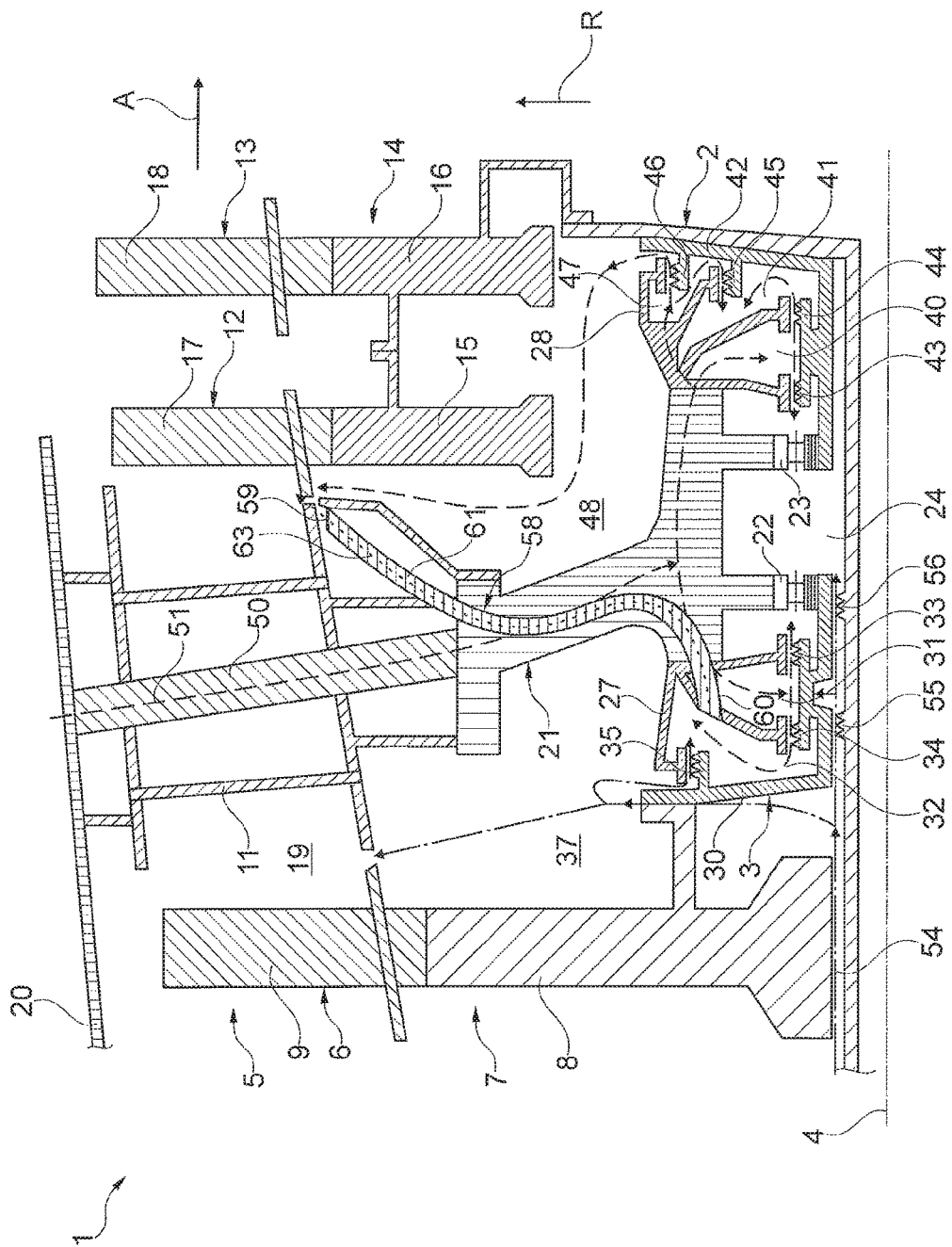

FIG. 1 shows a section of a jet engine 1 or aircraft engine in a longitudinal sectional view in the area of a turbine device 5. In the present case, the jet engine 1 is embodied with two shafts with a low-pressure shaft 2 and a high-pressure shaft 3 that are mounted so as to be rotatable around a rotational axis 4. In an alternative embodiment of the invention, the jet engine can also be embodied with three shafts.

What can further be seen is a stage 6 of a high-pressure turbine 7 of the turbine device 5 that is embodied with a disc wheel 8 and with rotor blades 9 that are circumferentially arranged thereat. In a comparable manner two stages 12, 13 of a low-pressure turbine 14 of the turbine device 5 can be seen here that are also respectively embodied with a disc wheel 15 or 16 and with rotor blades 17 or 18 that are circumferentially arranged thereat. The rotor blades 9 of the high-pressure turbine 7 are arranged in a core flow channel 19 of the jet engine 1 together with the rotor blades 17, 18 of the low-pressure turbine.

In the axial direction A of the jet engine 1, a bearing chamber support 21 that is fixedly connected to a housing 20 in the area of the guide blades 11 of the low-pressure turbine 14 is arranged between the high-pressure turbine 7 and the low-pressure turbine 14, delimiting a bearing chamber 24 having two bearing appliances 22, 23 outwards in the radial direction R of the jet engine 1. The high-pressure shaft 3 is mounted opposite the low-pressure shaft 2 via the bearing appliances 22, 23.

In axial direction A of the jet engine 1, upstream and downstream of the bearing chamber support 21, the latter is respectively fixedly connected to a seal carrier 27, 28 that has multiple arms, wherein the seal carrier 27, together with a support shaft 30 that is fixedly connected with the disc wheel 8 of the high-pressure turbine 7, delimits a sealing chamber 31 that is arranged upstream of the bearing chamber 24 as well as a de-aeration chamber 32 that is adjoining the sealing chamber 31 on a side that is facing away from the bearing chamber 24. Here, the chambers 24, 31, 32 are respectively separated from each other through sealing appliances that are embodied as labyrinth seals 33, 34, 35, wherein the labyrinth seal 33 is arranged between the bearing chamber 24 and the sealing chamber 31, and the labyrinth seal 34 is arranged between the sealing chamber 31 and the de-aeration chamber 32. The de-aeration chamber 32 is separated from the internal space 37 that comprises the disc wheel 8 through the further labyrinth seal 35.

A sealing chamber 40 and a de-aeration chamber 41 are also provided downstream of the bearing chamber 24. The sealing chamber 40 is arranged downstream of the bearing chamber 21, separated from the bearing chamber 21 by a sealing appliance that is embodied as a labyrinth seal 43, and delimited by the seal carrier 28 and a support shaft 42 that is fixedly connected to the low-pressure shaft 2. Downstream of the sealing chamber 40, the de-aeration chamber 41 is arranged on the side of the sealing chamber 40 that is facing away from the bearing chamber 21. The de-aeration chamber 41 is separated from the sealing chamber 40 by means of a sealing appliance that is again embodied as a labyrinth seal 44, and is also delimitated by the seal carrier 28 and the support shaft 42. Here, one further chamber 47 is arranged on the side of the de-aeration chamber 41 that is facing away from the sealing chamber 40, on the one hand being separated from the de-aeration chamber 41 through a sealing appliance that is embodied as a labyrinth seal 45, and on the other hand adjoining an internal space 48, inside of which the disc wheels 15, 16 of the low-pressure turbine 14 are arranged, via one further sealing appliance that is embodied as a labyrinth seal 46.

A sealing air conduit 50 is provided, extending through the core flow channel 19 to the bearing chamber support 21 that is embodied as a cast component, and being led to an annular space within the bearing chamber support 21 via passages in the bearing chamber support 21, which cannot be seen here in any more detail, with the annular space in the bearing chamber support 21 being in operative connection with the sealing chambers 31 and 40. During operation of the jet engine 1, sealing air, for example pressurized air from a compressor stage, is conducted via the sealing air conduit 50 through the passages and the annular space into the sealing chamber 31 that is arranged upstream of the bearing chamber 24, as well as into the sealing chamber 40 that is arranged downstream of the bearing chamber 24. From the sealing chambers 31 or 40, the sealing air is supplied via the labyrinth seals 33 and 43 to the bearing chamber 24, thus sealing the same.

During operation of the jet engine 1, air in the area of the bearing chamber 24 is mixed with oil that is provided for lubricating the bearing appliances 22, 23, so that an air-oil mixture is present in the area of the bearing chamber 24. By means of the sealing air that is described above in more detail, a discharge of this oily mixture from the bearing chamber 24 is avoided.

Apart from the bearing chamber 24, also the respective de-aeration chamber 32 or 41 is impinged by sealing air via the labyrinth seals 34 or 44, starting from the sealing chambers 31, 40. In addition to being introduced into the sealing chamber 40 that is arranged downstream of the bearing chamber 24, the sealing air is also supplied from the annular space of the bearing chamber support 21 to the further chamber 47 that is arranged downstream of the bearing chamber 24. From there, the de-aeration chamber 41 is impinged with sealing air via the labyrinth seal 45, and also the internal space 48 is impinged with sealing air via the labyrinth seal 46, wherein the sealing air is supplied to the core flow channel 19 from the internal space 48 via an area that is arranged downstream of the sealing air conduit 50.

In addition, the bearing chamber 24 is impinged by a further sealing air flow, which is supplied to the bearing chamber 24 according to the dotdashed line 54 via two further sealing appliances that are embodied as labyrinth seals 55, 56 and that are arranged between the low-pressure shaft 2 and the support shaft 30 of the high-pressured shaft 3. Further, the sealing air is introduced into the sealing chamber 31 that is arranged upstream of the bearing chamber 24 via an opening in the support shaft 30 of the high-pressure shaft 3, which is not shown in any more detail in the Figures. In addition, the sealing air is also supplied to the internal space 37 upstream of the de-aeration chamber 32, from where, on the one hand, it is conducted back into the core flow channel 19 and, on the other hand, through the labyrinth seal 35 into the de-aeration chamber 32.

FIG. 1 further shows an air extraction duct 58 or hot vent conduit that is connected to the de-aeration chamber 32 upstream of the bearing chamber 24. The air extraction duct 58 first extends from the de-aeration chamber 32 substantially in the axial direction A of the jet engine 1 through the seal carrier 27 to the bearing chamber support 21. Inside the bearing chamber support 21, the air extraction duct 58 extends substantially in the radial direction R of the jet engine 1 outward towards an outlet 59 of the air extraction duct 58 that is arranged in an area of an annulus of the core flow channel 19, which is arranged downstream of the sealing air conduit 50 and is in operative connection with the internal space 48. As can be seen in FIG. 1, the entire air extraction duct 58 substantially extends in a longitudinal section plane of the jet engine 1.

In the present case, the air extraction duct 58 is formed integrally with the bearing chamber support 21 that is embodied as a cast component and can be manufactured in a simple manner together with the same in one casting process. In the present case, respectively connectors 60, 61 or extensions are cast-on at the bearing chamber support 21 in an area that is facing towards the core flow channel 19 as well as in an area that is facing towards the de-aeration chamber 32, and they can be manufactured in one step with the bearing chamber support 21. As an alternative, it can also be provided that the connectors are separate structural components that can be arranged at the bearing chamber support 21.

Air that is present in the area of the de-aeration chamber 32 during operation of the jet engine 1 is conducted through the air extraction duct 58 into the core flow channel 19 along the dotted line 63. The air extraction duct 58 is provided for the purpose of preventing that, in the event that air impinged by oil exits the bearing chamber 24 in the direction of the sealing chambers 31 or 40 and the de-aeration chambers 32 or 41, it cannot reach the internal space 37, in the area of which an ignition of the air-oil mixture could cause an undesired damage, but that is instead discharged into the core flow channel 19, in the area of which an ignition of the air-oil mixture can be easily handled.

As a whole, the air extraction duct 58 is embodied in a tubular manner with a presently oval flow cross-section, wherein the flow cross-section of the air extraction duct 58 remains substantially unchanged from the de-aeration chamber 32 all the way to the outlet 59. In this manner it can be achieved in a simple manner that a flow velocity of the mix that is conducted inside the air extraction duct 58 lies above an ignition speed particularly in all operating states, so that, in case that air loaded with oil is conducted inside the air extraction duct 58, an ignition of this mix is securely prevented in the area of the air extraction duct 58.

Figure 2:
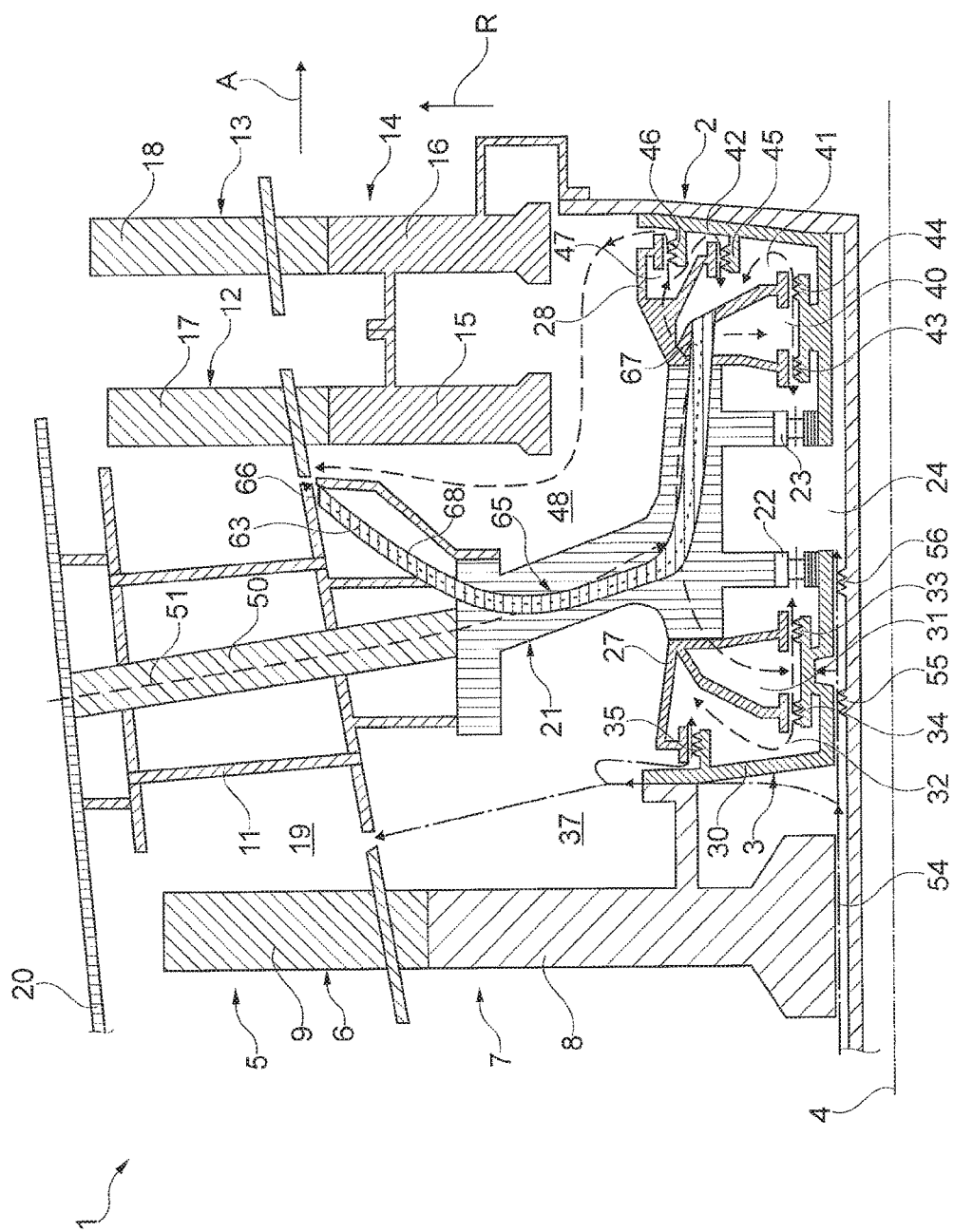
FIG. 2 shows a further longitudinal sectional view of a section of the jet engine of FIG. 1, wherein a further air extraction duct that is integrated in a bearing chamber support and that is connected to the de-aeration chamber arranged downstream of the bearing chamber can be seen in more detail.

In FIG. 2, a further air extraction duct 65 can be seen in more detail, which is connected to the de-aeration chamber 41 that is arranged downstream of the bearing chamber 24. From the de-aeration chamber 41, the air extraction duct 65 first extends substantially in the axial direction A of the jet engine 1 upstream in the direction of the bearing chamber support 21, wherein the air extraction duct 65 extends substantially outward in the radial direction R of the jet engine 1 inside the bearing chamber support 21 and up to an outlet 66 of the air extraction duct 65. Here, the outlet 66 is arranged in the axial direction A of the jet engine 1 in an area that substantially corresponds to the area in which the outlet 59 of the air extraction duct 58 is arranged.

In a comparable manner to the air extraction duct 58, the air extraction duct 65 also extends substantially in a longitudinal section plane of the jet engine 1. In the present case, the longitudinal section plane in which the air extraction duct 65 is arranged is rotated by approximately 180° around the rotational axis 4 with respect to the longitudinal section plane in which the air extraction duct 58 is arranged. Principally, an angle between the longitudinal section planes in which the air extraction ducts are arranged can be freely chosen.

The air extraction duct 65 is also manufactured in one molding procedure with the bearing chamber support 21, wherein again respectively one connector 67, 68 or extension is cast-on in an area of the bearing chamber support 21 that is facing towards the core flow channel 19 as well as in an area of the bearing chamber support 21 that is facing towards the de-aeration chamber 32.

In a manner that is comparable to the one described with respect to air extraction duct 58, a volume flow can be discharged from the de-aeration chamber 41 that is arranged downstream of the bearing chamber 24 into the core flow channel 19 through the air extraction duct 65, wherein the air extraction duct 65 is also embodied in a tubular manner with an oval flow cross-section, which is substantially identical in the area of the entire air extraction duct 65.

Apart from the air extraction duct 58 and the further air extraction duct 65, further air extraction ducts can be provided that are connected to the de-aeration chamber 32 or to the de-aeration chamber 41 and that are in particular arranged in other circumferential areas of the jet engine 1.

Figure 3:
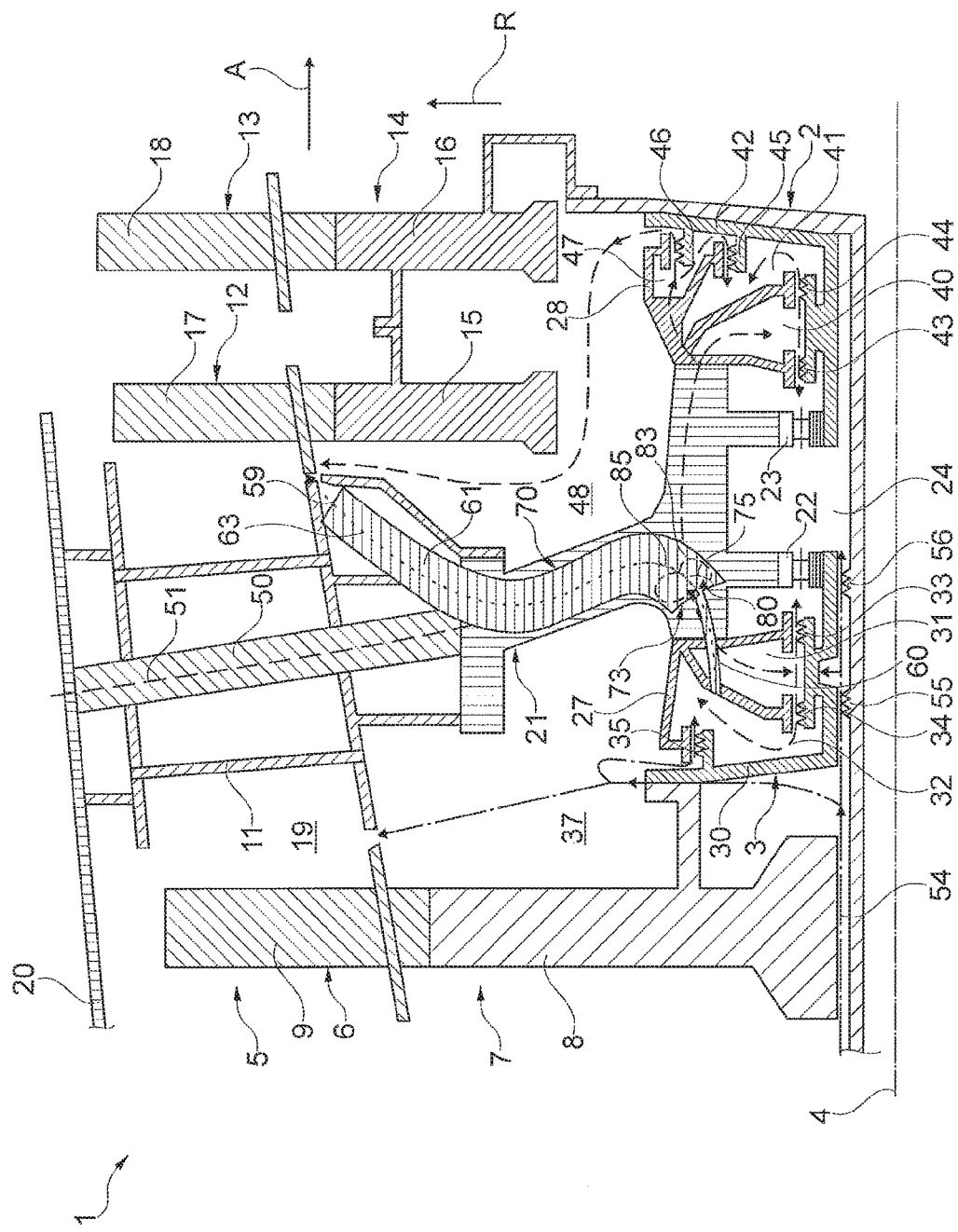
FIG. 3 shows a rendering of the jet engine that corresponds to FIG. 1, wherein one further embodiment of an air extraction duct that is integrated in the bearing chamber support is shown with a recirculation area.
Figure 4:
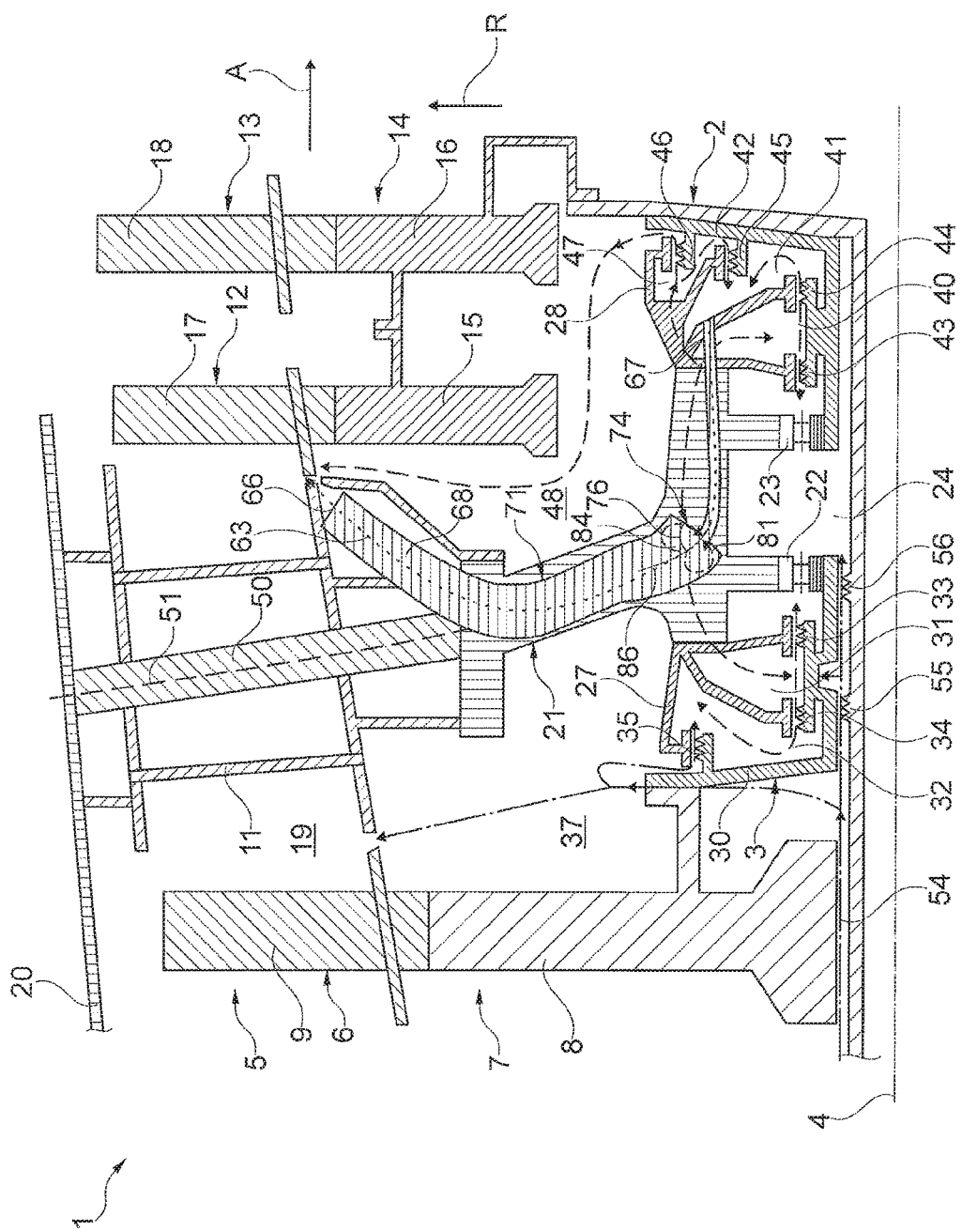
FIG. 4 shows a rendering of the jet engine that corresponds to FIG. 2, wherein one further embodiment of a further air extraction duct that is integrated in the bearing chamber support and has a recirculation area can be seen.

FIG. 3 and FIG. 4 show air extraction ducts 58 and 65 that are embodied in a manner alternative to the air extraction ducts 70 and 71, wherein in the following only the differences to the air extraction ducts 58 and 65 are discussed, and the air extraction ducts 70 and 71 are otherwise embodied in a manner substantially comparable to the air extraction ducts 58 and 65.

Inside the bearing chamber support 21, the air extraction ducts 70 and 71 respectively have a defined area, a so-called recirculation area 73 or 74, in which a flow cross-section of the air extraction ducts 70 and 71 increases by a leap, in the present case by a factor of approximately ten. An angle 75 or 76 of a wall 80 or 81 in the respective recirculation area 73 or 74 is respectively approximately 90° with respect to a central axis 85 or 86 of the air extraction duct 70, 71. The flow cross-section of the respective air extraction duct 70 or 71 is substantially constant upstream of the respective recirculation area 73 or 74 as well as downstream of the respective recirculation area 73 or 74.

Through the recirculation areas 73 or 74 an area is created in which a flow velocity in the respective air extraction duct 70 or 71 is reduced and recirculations or swirls are formed according to the flow lines 83, 84. In this manner it can be ensured in a simple manner that, should an oil fire occur, it occurs in the area of the recirculation areas 73 or 74 and can only burn stably in this one area. If required, sensors can be arranged in the recirculation areas 73 or 74 in order to be able to detect such an oil fire in a simple manner. In addition, the areas of the bearing chamber support 21, in which the recirculation areas 73 and 74 are arranged, can be embodied with an appropriate material thickness, so that the high temperature that would occur in the event of an oil fire can be absorbed to a desired degree by the bearing chamber support 21.

In FIGS. 5 and 6, further embodiments of air extraction ducts 77, 78 are shown, that are respectively embodied with an recirculation area 73, 74 in a manner principally comparable to the air extraction ducts 70 and 71. However, in contrast to the air extraction ducts 70, 71 the air extraction ducts 77, 78 are embodied as conduits that are separate from the bearing chamber support 21 and that are led through the internal space 37 or the internal space 48 to the annulus of the core flow channel 19. The air extraction ducts 77, 78 can for example be embodied with a high-temperature resistant metal or with a ceramic material.

In an embodiment of the invention that is alternative to this one, it can also be provided that the air extraction ducts are embodied as conduits that are separate from the bearing chamber support and have a substantially constant flow cross-section in a manner comparable to the air extraction ducts 58 and 65.

In an alternative embodiment of the invention it can also be provided that the sealing appliances are embodied not as labyrinth seals, but as other forms of seals.

PARTS LIST 1 jet engine
2 low-pressure shaft
3 high-pressure shaft
4 rotational axis
5 turbine device
6 stage of the high-pressure turbine
7 high-pressure turbine
8 disc wheel
9 rotor blade
11 guide blade
12, 13 stage of the low-pressure turbine
14 low-pressure turbine
15, 16 disc wheel
17, 18 rotor blade
19 core flow channel
20 housing
21 bearing chamber support
22, 23 bearing appliance
24 bearing chamber
27, 28 seal carrier
30 support shaft
31 sealing chamber
32 de-aeration chamber
33, 34, 35 sealing appliance; labyrinth seal
37 internal space
40 sealing chamber
41 de-aeration chamber
42 support shaft
43, 44, 45, 46 sealing appliance; labyrinth seal
47 further chamber
48 internal space
50 sealing air conduit
51 dashed line
54 dotdashed line
55, 56 sealing appliance; labyrinth seal
58 air extraction duct
59 outlet
60, 61 connector
63 dotted line
65 further air extraction duct
66 outlet
67, 68 connector
70 air extraction duct
71 further air extraction duct
73, 74 recirculation area
75, 76 angle
77 air extraction duct
78 further air extraction duct
80, 81 wall
83, 84 flow line
85, 86 central axis
A axial direction of the jet engine
R radial direction of the jet engine

The invention claimed is:

1. A jet engine, comprising:
a bearing chamber,
a sealing chamber,
a de-aeration chamber, and
a bearing chamber support that delimits the bearing chamber and includes at least one bearing appliance in certain areas,
wherein the bearing chamber is separated from the sealing chamber via a sealing appliance,
a further sealing appliance separating the sealing chamber from the de-aeration chamber that is arranged at a side of the sealing chamber that is facing away from the bearing chamber, and
wherein the sealing chamber is connected to a sealing air conduit by which the bearing chamber is supplied with a sealing air volume flow, and
wherein the de-aeration chamber is connected to a de-airing appliance via which a volume flow can be discharged from the de-aeration chamber into a core flow channel of the jet engine,
wherein the de-airing appliance includes an air extraction duct with a tubular flow cross-section;
wherein the air extraction duct includes an area with a defined cross-sectional expansion.

2. The jet engine according to claim 1, wherein the bearing chamber support is a cast component and the air extraction duct is a part of the bearing chamber support.

3. The jet engine according to claim 1, wherein the air extraction duct is a separate conduit that at least in certain areas is arranged in a circumferential area of the bearing chamber support.

4. The jet engine according to claim 1, wherein the flow cross-section of the air extraction duct increases in the area by a factor of at least two.

5. The jet engine according to claim 1, wherein in the area, a wall of the air extraction duct has an angle with respect to a central axis of the air extraction duct that is larger than 15°.

6. The jet engine according to claim 1, wherein a flow cross-section of the air extraction duct is not enlarged downstream of the area with respect to a flow cross-section in the area.

7. The jet engine according to claim 1, wherein the sealing chamber and the de-aeration chamber are respectively arranged downstream of the bearing chamber.

8. The jet engine according to claim 7, wherein the air extraction duct is connected to the de-aeration chamber upstream of the bearing chamber, and further comprising a further air extraction duct is-connected to the de-aeration chamber downstream of the bearing chamber.

9. The jet engine according to claim 8, wherein the air extraction duct and the further air extraction duct are arranged in different circumferential areas of the jet engine.

10. The jet engine according to claim 8, wherein the air extraction duct and the further air extraction duct are connected to each other upstream of the core flow channel.

11. The jet engine according to claim 1, wherein the bearing chamber support is arranged in at least one chosen from an area of a turbine of the jet engine and an area of a compressor of the jet engine.

12. The jet engine according to claim 1, wherein the flow cross-section of the air extraction duct increases in the area by a factor of at least ten.

13. The jet engine according to claim 1, wherein in the area, a wall of the air extraction duct has an angle with respect to a central axis of the air extraction duct that is larger than 60°.

14. The jet engine according to claim 1, wherein in the area, a wall of the air extraction duct has an angle with respect to a central axis of the air extraction duct that is larger than 75°.

15. The jet engine according to claim 1, wherein in the area, a wall of the air extraction duct has an angle with respect to a central axis of the air extraction duct that is 90°.

16. The jet engine according to claim 1, wherein the sealing chamber and the de-aeration chamber are respectively arranged upstream of the bearing chamber.

* * * * *